(12) United States Patent
Demsey

(10) Patent No.: US 9,374,464 B1
(45) Date of Patent: Jun. 21, 2016

(54) SYSTEMS AND METHODS FOR ONLINE DATA-LINKED TELECOMMUNICATIONS DECISIONS AND DISTRIBUTION

(71) Applicant: AOL Advertising Inc., New York, NY (US)

(72) Inventor: Seth Mitchell Demsey, Dulles, VA (US)

(73) Assignee: AOL Advertising Inc., New York, NY (US)

( * ) Notice: Subject to any disclaimer, the term of this patent is extended or adjusted under 35 U.S.C. 154(b) by 0 days.

(21) Appl. No.: 14/957,961

(22) Filed: Dec. 3, 2015

(51) Int. Cl.
*H04M 1/64* (2006.01)
*H04M 3/493* (2006.01)
*H04M 3/487* (2006.01)
*H04M 3/22* (2006.01)

(52) U.S. Cl.
CPC .......... *H04M 3/4936* (2013.01); *H04M 3/2218* (2013.01); *H04M 3/4878* (2013.01)

(58) Field of Classification Search
CPC .................................................. H04M 3/4936
See application file for complete search history.

(56) References Cited

U.S. PATENT DOCUMENTS

| | | | | |
|---|---|---|---|---|
| 7,657,433 | B1 * | 2/2010 | Chang | G10L 15/08 704/236 |
| 9,305,226 | B1 * | 4/2016 | Yuan | G06K 9/18 |
| 2010/0106498 | A1 * | 4/2010 | Morrison | G10L 15/265 704/235 |
| 2014/0006158 | A1 * | 1/2014 | Cooper | G06Q 30/02 705/14.56 |
| 2015/0095028 | A1 * | 4/2015 | Karpey | G10L 17/26 704/246 |

* cited by examiner

*Primary Examiner* — Joseph T Phan
(74) *Attorney, Agent, or Firm* — Bookoff McAndrews, PLLC

(57) ABSTRACT

Systems and methods are disclosed for online data-linked telecommunications decisioning and distribution. One method includes receiving call data relating to a telephone call from a telephone device of a user to an interactive voice response ("IVR") system; accessing a database storing correlated call data and user data; retrieving correlated call data and user data based on the telephone number of the call data; determining a confidence score defining a confidence that the received call data relates to the retrieved correlated call data and user data; correlating the received call data with retrieved call data and user data when the confidence score is greater than a threshold value; determining an IVR response to present to the user via the IVR system; and transmitting the determined IVR response to the IVR system for presentation to the telephone device of the user.

20 Claims, 4 Drawing Sheets

SYSTEMS AND METHODS FOR ONLINE DATA-LINKED TELECOMMUNICATIONS DECISIONS AND DISTRIBUTION

TECHNICAL FIELD

The present disclosure relates to using call data and online data from multiple systems, of users who opt-in, for use in providing responses from interactive voice response systems that are targeted to a user.

BACKGROUND

Interactive voice response ("IVR") systems have become a popular method by which businesses interact with their users. IVR systems allow businesses to classify the reason a user is calling and/or allow businesses to direct users to an appropriate contact to address a user's reason for calling. IVR systems have allowed businesses to reduce operating costs by reducing telephone related staffing requirements. Such IVR systems typically answer incoming telephone calls and present predetermined menus and predetermined options to the user.

In an IVR system, the predetermined menus are typically presented, and a user must navigate the static menus to find an answer to the reason for the call. Navigating through such predetermined menus can be time consuming and frustrating, especially if the caller makes an incorrect selection during the navigation process. Users may be presented with menus unrelated to the user's reason for calling, because of the predetermined and static nature of the menus and options.

The present disclosure is directed to overcoming one or more of the above-referenced challenges, for example, by using call data and online data from multiple systems of users who opt-in, for use in providing IVR responses that are targeted to a user and include content and/or advertisements relevant to his or her call to an IVR system.

SUMMARY OF THE DISCLOSURE

Embodiments of the present disclosure include systems and methods for online data-linked telecommunications decisioning and distribution.

According to embodiments of the present disclosure, computer-implemented methods for online data-linked telecommunications decisioning and distribution are disclosed. One method includes receiving, over an electronic network, call data relating to a telephone call from a telephone device of a user to an interactive voice response ("IVR") system, the call data including a telephone number of the telephone device of the user; accessing, by at least one processor, a database storing correlated call data and user data; retrieving, by the at least one processor, correlated call data and user data based on the telephone number of the call data; determining, by the at least one processor, a confidence score defining a confidence that the received call data relates to the retrieved correlated call data and user data; correlating, by the at least one processor, the received call data with retrieved call data and user data when the confidence score is greater than a threshold value; determining, by the at least one processor, an IVR response to present to the user via the IVR system, based on the correlated call data and user data; and transmitting, over the electronic network, the determined IVR response to the IVR system for presentation to the telephone device of the user.

According to embodiments of the present disclosure, a systems for online data-linked telecommunications decisioning and distribution are also disclosed. One system includes a data storage device that stores instructions system for online data-linked telecommunications decisioning and distribution; and a processor configured to execute the instructions to perform a method including: receiving, over an electronic network, call data relating to a telephone call from a telephone device of a user to an interactive voice response ("IVR") system, the call data including a telephone number of the telephone device of the user; accessing a database storing correlated call data and user data; retrieving correlated call data and user data based on the telephone number of the call data; determining a confidence score defining a confidence that the received call data relates to the retrieved correlated call data and user data; correlating the received call data with retrieved call data and user data when the confidence score is greater than a threshold value; determining an IVR response to present to the user via the IVR system, based on the correlated call data and user data; and transmitting, over the electronic network, the determined IVR response to the IVR system for presentation to the telephone device of the user.

According to embodiments of the present disclosure, non-transitory computer-readable media storing instructions that, when executed by a computer, cause the computer to perform a method for online data-linked telecommunications decisioning and distribution are disclosed. The method of the non-transitory computer-readable medium including: receiving, over an electronic network, call data relating to a telephone call from a telephone device of a user to an interactive voice response ("IVR") system, the call data including a telephone number of the telephone device of the user; accessing, by at least one processor, a database storing correlated call data and user data; retrieving, by the at least one processor, correlated call data and user data based on the telephone number of the call data; determining, by the at least one processor, a confidence score defining a confidence that the received call data relates to the retrieved correlated call data and user data; correlating, by the at least one processor, the received call data with retrieved call data and user data when the confidence score is greater than a threshold value; determining, by the at least one processor, an IVR response to present to the user via the IVR system, based on the correlated call data and user data; and transmitting, over the electronic network, the determined IVR response to the IVR system for presentation to the telephone device of the user.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

Figure 1:
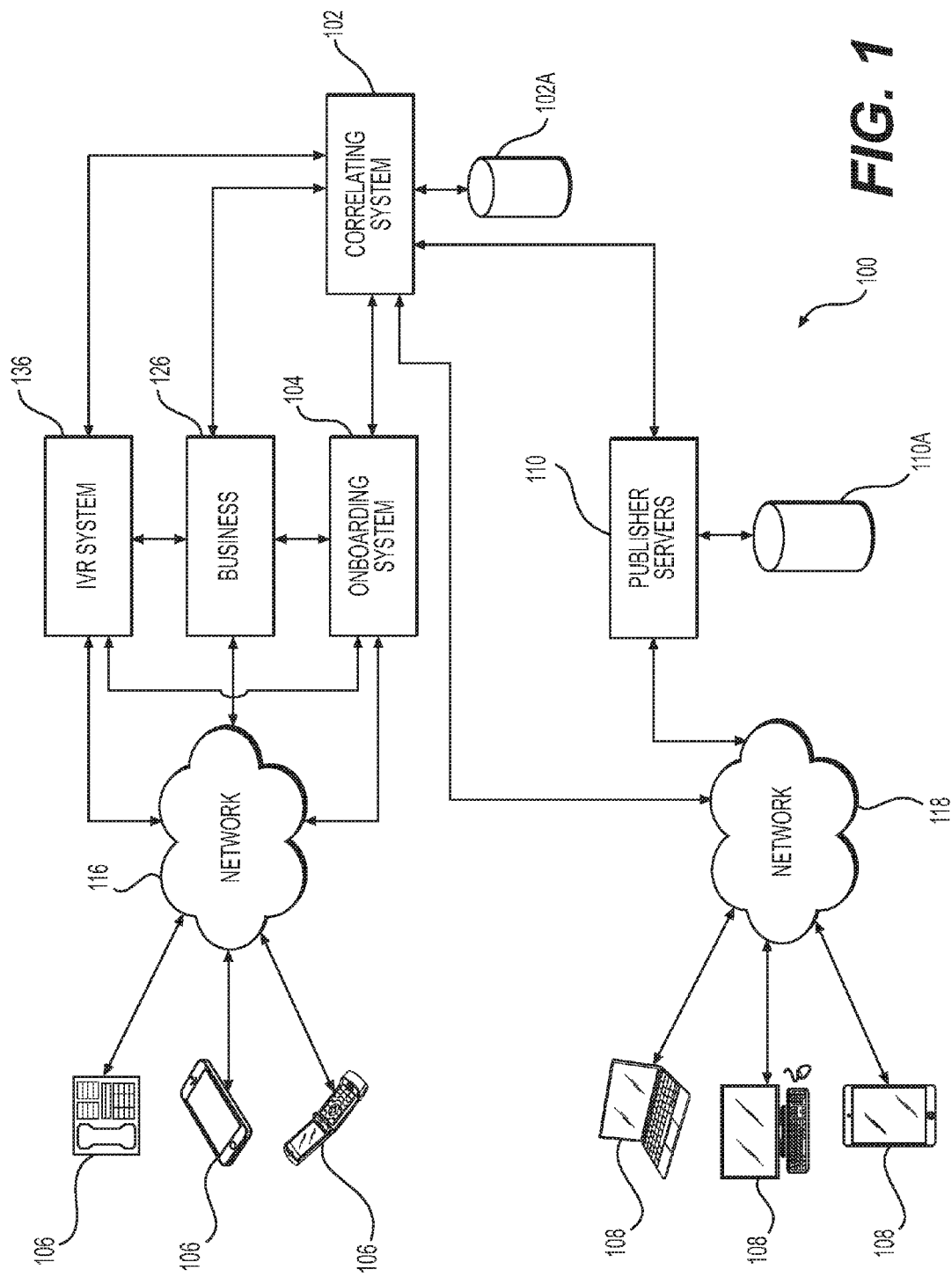
FIG. 1 depicts a schematic diagram of a network environment for online data-linked telecommunications decisioning and distribution, according to an exemplary embodiment of the present disclosure.

It is to be understood that the figures are not necessarily drawn to scale, nor are the objects in the figures necessarily drawn to scale in relationship to one another. The figures are depictions that are intended to bring clarity and understanding to various embodiments of apparatuses, systems, and methods disclosed herein. Wherever possible, the same reference numbers will be used throughout the drawings to refer to the same or like parts. Moreover, it should be appreciated that the drawings are not intended to limit the scope of the present teachings in any way.

DETAILED DESCRIPTION OF EMBODIMENTS

Specific embodiments of the present disclosure will now be described with reference to the drawings.

In an exemplary embodiment, a user may call a business having an IVR system. The IVR system may determine an identity of the user based on a telephone number of the user, and/or the IVR may transmit the telephone number of the user to a correlating system for determining the identity of the user. During or after determining the user identity, the IVR system may present the user with a number of menu options in order to address the user's reason for telephoning the business and/or IVR system. The menu options that are presented to the user may be generated based on the call data and user data stored in a database in association with the user's identity. For example, if the user likes sports, the menu options presented to the user may be sports related. Additionally, the IVR system may present advertisements to the user based on call data and user data. When the user interacts with the IVR system, the interactions, along with previously stored call data and user data may be used to determine a response by the IVR system.

The present disclosure relates to systems and methods that may provide dynamic interactive voice response ("IVR") systems that can provide targeted content and/or advertisements based on telephone calls by users to IVR systems and based on online user data related to the user making the telephone call.

In some embodiments, users and/or businesses may elect to provide an opt-in preference that reflects their desire to transmit and/or receive call data and/or user data to a correlating system. When a user and/or business opts-in to provide call data and/or user data, the call data and/or user may be used to present content and/or advertisements that relate to specific topics of interests in lieu of standard content and/or advertisements presented in a static IVR system. The opt-in preferences may be a user-provided opt-in preference and/or a business-provided opt-in preference regarding telephone call data and/or user data that they wish to have used to order to provide targeted advertisement and/or content during an IVR session with an IVR system, instead of receiving static content and/or advertisements that is typically presented in a static IVR system. Accordingly, specific information relating to a user's and/or a business's preferences may be provided in content and/or advertising spaces in lieu of traditional presentation of advertisements or content.

In order for the IVR system to be able to use online data in decisioning and distribution, browsers and applications on a user's computing device, such as a laptop computer and/or mobile phone, may provide a user's associated user identifier to a publisher and/or advertiser when the user visits a web page or uses an application. The user identifier may be used to lookup corresponding user data about the user in order to provide content and/or advertisements that are relevant to the user.

According to embodiments of the present disclosure, call data related to a user's phone call to an IVR system may be used to provide targeted content and/or advertisements to the user during an IVR session. Call data may be received during a user's phone call to an IVR system of a business. The call data may be used by the IVR system in determining targeted content and/or advertisements to present to the user during an IVR session. Alternatively the IVR system may transmit call data related to the user's interactions with the IVR system to a correlating system that may use the call data, with other user data, to determine targeted content and/or advertisements for presentation to the user during the IVR session.

FIG. 1 depicts a block diagram of a telecommunications and online environment 100 in which telephone call data and online user data may be used for providing dynamic menu option, targeted content, and/or advertising within an IVR system, according to embodiments of the present disclosure. A correlating system 102 may correlate call data, such as the telephone number of a user device, with user data associated with the user and stored in a database 102A. The correlation between the call data and user data may be used to provide dynamic menu options, targeted content, and/or advertising to the user within an IVR system, via a user's computing device 108 and/or through a telephone and/or mobile device 106.

The correlating system 102 may receive call data via a public switched telephone network ("PSTN") and/or a mobile telephone network 116 from the telephone and/or mobile device 106 of the user. The correlating system 102 may also receive user data via a network 118, such as the Internet, a private network, a public network, a wired network, and/or a wireless network, from the computing device 108 of the user. In cases in which the telephone and/or mobile device 106 is a smart phone, the telephone and/or mobile device 106 and the computing device 108 may be the same device.

A user, using the telephone and/or mobile device 106, may connect to the telephone network 116 by calling one or more telephone numbers associated with respective businesses 126. When a user calls a desired business 126, he or she may be dialing a phone number associated with the desired business. The dialed number may allow the call to be routed through the PSTN or mobile phone network 116 to the business 126. The telephone call may be routed directly to the desired business 126, and/or routed indirectly through an onboarding system 104 for collecting call data. In an embodiment, a business 126 may have an interactive voice response ("IVR") system 136 to automate the interaction with the user.

A telephone and/or mobile device 106 of the user may connect to the IVR system 136 via the PSTN or mobile phone network 116 directly and/or indirectly through one or both of business 126 and onboarding system 104. The IVR system 136 may include one or more applications that receives and processes one or both of voice input and keypad input from the user. The IVR system 136 may respond to the user based on the received voice and/or keypad input. The IVR system 136 may also receive input from one or more of onboarding system 104, business 126, and/or correlating system 102 in order to interact with the user.

Figure 2:
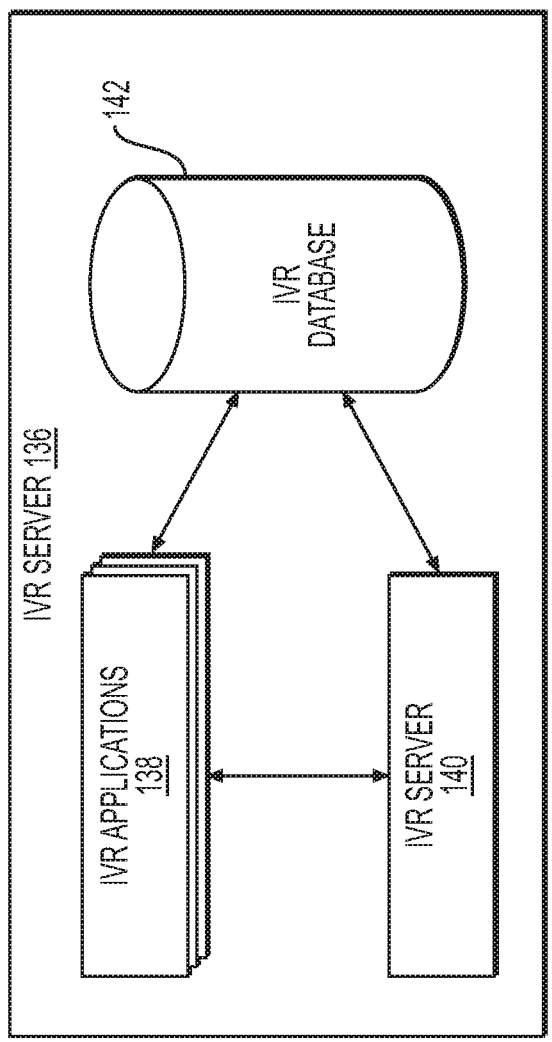
FIG. 2 depicts a schematic diagram of an exemplary interactive voice response system, according to an exemplary embodiment of the present disclosure.

The voice and keypad inputs from the user to the IVR system 136 may be in response to options presented within an IVR menu. The IVR system 136 may generate targeted menus and/or options for a particular user based upon voice input, keypad input, and/or input from one or more of onboarding system 104, business 126, and/or correlating system 102. The IVR system 136 may also store IVR interaction data of the user in an IVR database 142 (FIG. 2). Additionally, the IVR system 136 may transmit the IVR interaction data to one or more businesses 126 and/or correlating system 102.

Call data relating to a telephone call initiated by a user may be transmitted to the correlating system 102 by one or more of the business 126, onboarder system 104, and/or the IVR system 136. Call data may include one or more of call metadata, a telephone number dialed, a telephone number of the dialer, a call time, a call date, a length of the phone call, a type of the goods and/or services provided by the business associated with the telephone number, responses to an IVR system 136, data related to the user calling, and/or other data provided by the business 126, IVR system 136, and/or onboarder system 104

A user, using a computing device 108, may interact with websites hosted by publishers servers 110 via network 118. Data related to the identity and/or interactions between the computing device 108 of the user and publisher servers 110 connected via network 118 may be used to generate user data stored in database 110A.

For example, the computing device 108 may execute a web browser or other application that is used to interact with a publisher website, such as Huffington Post, Engadget, New York Times, Facebook, etc. The computing device 108 may be a personal computer, laptop computer, notebook computer, tablet computer, smartphone, portable media player, gaming device, or other computing device that allows a user to access websites and/or applications associated with publisher servers 110.

The computing device 108, via network 118, such as the Internet, may connect to websites and/or applications of publisher server 110. For example, the computing device 108 may receive, display, and interact with the publisher server 110 via HTTP and/or other supported communication protocol. To allow the user's online activity to be identified, a publisher server 110 may use a user identifier to identify activities of the user each time the publisher server 110 is connected to by the computing device 108 of the user. The user identifier may be a cookie associated with a browser, a unique device identifier such as an International Mobile Station Equipment Identity ("IMEI") number, an International Mobile Subscriber Identifier ("IMSI"), or other identifier that may be placed on the computing device 108 and/or read by the publisher server 110. For example, if a computing device 108 visits a website, the publisher server 110 may place a cookie on the computing device 108 reflecting the website session and certain activities that were performed. The publisher server 110 may store a record of the user's interaction with the website and/or application, including details regarding any advertisements that were served by the publisher to the user's computing device 108 in a publisher server database 110A. If the computing device 108 visits the website of the publisher server 110 again, then additional interactions and advertisements may be associated with the user by virtue of the stored cookie and/or other user identifier. The user data stored in the publisher server database 110a may be transmitted to the correlating system 102 to populate the user data stored in correlating system database 102A, and may be used to correlate the user data with the call data stored in the correlating system database 102A.

The correlating system 102 may correlate user identifiers representing online activities of users with telephone numbers associated with each user. A user identifier (e.g., a cookie, a device or subscriber identifier, a user ID) may be provided by a website of a publisher server 110 and/or other party to identify the online behavior of a user. The correlation between user identifier and telephone number may be explicitly identified, such as when a user provides a phone number to a website as part of a log-in process or as part of a purchase of a good or service through a website.

For example, publisher server 110 may receive a telephone number of a telephone and/or mobile device 106 by the user providing the telephone number as part of a transaction with a publisher website. For example, the user may order goods and services from the website by filling out a transaction form and include a name, address, telephone number, payment information, and other details. If the user provides a telephone number as part of a transaction with the website of the publisher server 110, the publisher server 110 may be able to correlate the online activities of the user, including any advertisements presented to the user, with the user's telephone number.

The correlation between user identifier and telephone number may also be implicitly identified, such as when a identification telephone number is displayed in an advertisement on a user's computing device 108, and a telephone call is received to that identification telephone number within a threshold period after display of the advertisement. Because of the inherent uncertainty in drawing correlations between user identifiers and telephone numbers, the correlating system 102 may include a confidence score associated with the user data and call data. The confidence score may represent the likelihood that a particular telephone number is correlated with a particular user identifier.

After correlating call data and user data with a particular user, targeted advertising via the telephone and/or mobile device 106, the computing device 108, and/or the IVR system 136 may be implemented by using either one or both of user data and call data. The correlating system 102 may use user data and call data stored in database 102A to identify users that may be re-targeted on behalf of a business 126 and/or IVR system 136 called by a user. The user may be re-targeted via one or more of telephone and/or mobile device 106, IVR system 136, and/or the computing device 108.

The correlating system 102 may also be used for targeted advertising to users. For example, businesses 126 and/or IVR system 136 may be receiving telephone calls from potential customers that do not result in a conversion, such as a sale and/or information about the user. For example, a user may call a business 126 and/or IVR system 136 to inquire about a product and/or services. When the business 126 and/or IVR system 136 receives the call from the user, the business 126 and/or IVR system 136 may be able to identify the user calling from caller ID. However, the business 126 and/or IVR system 136 may not receive, for example, a user's address and/or reason for calling. In order to target advertisements to those users that have failed to provide certain information to the business 126 and/or IVR system 136 as a result of the telephone call, the business 126 and/or IVR system 136 may provide call data, such as the user's telephone number and the type of goods and/or services provided by business 126 and/or IVR system 136 to correlating system 102. The business 126 and/or IVR system 136 may also provide an advertisement and/or request a certain action to be taken by correlating system 102.

Using the correlating system database 102A, the correlating system 102 may identify a user identifier that is associated with the telephone number. The correlating system 102 may use the identified user identifier, and provide user data and call data to publisher servers 110 and/or IVR system 136 to target advertisements to the user via the computing device 108 of the user and/or via the telephone and/or mobile device 106 of the user. Thus, the correlating system 102 allows user calls to businesses 126 and/or IVR system 136 by telephone and/or mobile device 106 to be re-targeted by targeted advertising provided on websites of publisher servers 110 visited by the computing device 108. Further, the correlating system 102 allows user calls to businesses 126, previous calls to IVR system 136, and/or interactions by the user with websites of publisher servers 110 to be used for dynamically updating IVR menus, or targeting advertisements to the user via IVR system 136.

Publisher servers 110 may transmit user data to the correlating system 102. The user data transmitted by publisher servers 102 may include user identifiers, impression data, and/or activity data. The user impression data received from publisher server 110 may be, for example, the display of an advertisement to the user, and/or a purchase of an item from a website by the user. The activity data may be, for example, a time and date of an interaction, a price of the goods and/or services viewed and/or ordered, a quantity of the goods and/or services order, and/or other information associated with an impression. User identifiers may be a user ID, a phone number that the user provided, address information, and/or log-in information. While the embodiments discussed herein describe the correlating system 102 receiving user data from a single publisher server 110, the correlating system 102 may receive user data from multiple publisher servers of multiple publishers.

As discussed above, the correlating system 102 may also receive call data of users' telephone calls to businesses 126 and/or IVR system 136. When a user dials a business 126 and/or IVR system 136, the business 126, IVR system 136, PSTN and/or a mobile telephone network 116, and/or onboarder system 104 may determine the phone number associated with the telephone and/or mobile device 106 of the user by using, among other things, a caller identification ("caller ID") service. With a caller ID service, the user's telephone number may be transmitted to the IVR system's and/or business's 126 telephone equipment during the ringing signal, and/or when the call is being set up but before the call is answered. The detected telephone number may be captured and stored by the business 126, IVR system 136, and/or onboarder system 104. Call data, which may include information relating to the interactions between the business 126 and/or IVR system 136 and the user, may be maintained by the business 126, IVR system 136, and/or onboarder system 104. The call data may then be transmitted by the business 126, IVR system 136, and/or onboarder system 104 to the correlating system 102. Additionally, the call data may be transmitted to IVR system 136 by the business 126 and/or onboarder system 104.

The call data provided by business 126 and/or IVR system 136 may be used by the correlating system 102 to provided dynamic menu options, targeted content, and/or advertisements to users during telephone calls with an IVR system 136. Call data may include data related to an interaction of a user with a business 126 and/or IVR system 136. For example, call data may include data that indicates a characterization of the user's transaction with the business 126 and/or IVR system 136, such as that the user called to inquire about the address of the business 126 or the user called IVR system 136 to inquire about his or her statement. Call data may also include the telephone phone number of the telephone and/or mobile device 106 of the user, a time and a date of when the telephone call occurred, and/or a duration of the telephone call. If the business 126 has an IVR system 136, call data may also include the user's voice input and/or keypad input to the IVR system 136 and/or responses of the IVR system 136. Business 126 and/or IVR system 136 may also provide call data that relates to the user, such as the name, an address, and/or an email address of the user. While the embodiments discussed herein describe the correlating system 102 receiving call data from a business 126, IVR system 136, and/or onboarder system 104, the correlating system 102 may alternatively receive user data from multiple businesses, IVR systems, and/or onboarder systems.

Once the correlating system 102 receives call data and user data, each of businesses 126, IVR system 136, and/or publisher servers 110 may use the correlating system 102 to provide dynamic menu options in an IVR system that include targeted content and/or advertisements, to provide targeted content and/or advertisements to the user through his or her computing device when he or she visits a website, and/or by business reaching out to its users.

In the course of performing IVR operations, the IVR system 136 may access an IVR database 142 and/or correlating system 102. The IVR database 142 may store information about particular users, IVR system parameters, as well as IVR interactions by the user. The IVR database 142 may also may also be replaced by the correlating system database 102.

FIG. 2 depicts and exemplary IVR system, according to embodiments of the present disclosure, the IVR system 136 may include one or more IVR applications 138, one or more IVR servers 130, and one or more IVR databases 142. In one embodiment, the IVR system 136 may be a separate element of the correlating system 102. In another embodiment, the IVR system 136 may be replaced by correlating system 102. The IVR system 136 may alternatively be implemented by multiple servers in a distributed fashion. Consequently, there are many potential configurations for the IVR system 136, as shown in FIGS. 1 and 2.

The IVR applications 138 may include one or more of a voice processor application, an identification application, a recordation application, and/or a menu application. The voice processor application may provide voice processing features, such as a speech recognition engine that recognizes speech and a voice processing system for matching a subscriber voice to a known subscriber voice profile for purposes of speaker identification, a text-to-speech system for converting text to an audio stream, as well as an audio playback system. The voice processor application may be communicatively linked to a database, such as the IVR server 140 and/or IVR database 142.

The identification application may determine an identity for the user connection to the IVR system 136. The identity of the user may be determined based upon the telephone number associated with the telephone and/or mobile device 106 of the user. Alternately, the identification program may transmit the telephone number of the user to correlating system 102 for identification of the user. In another embodiment, the user may provide identification information to the identification program directly.

Once the user has been identified, the IVR system 136 may access and store call data and/or user data of the user stored in IVR database 142 and/or provided by correlating system 102.

The recordation application may record user interactions and IVR responses corresponding to the user's interactions. For example, the recordation program may update data relating to the user's interactions with the IVR system 136 and store the updated data in IVR database 142 and/or transmit the data to correlating system 102 for storage.

The menu application may generate a customized menu, customized content, and/or customized advertisements based upon the correlated data received within the IVR system 136. In one embodiment, the menu application may generate an option menu and may present this option menu to the user. The generated menu may include one or more options. For example, the user may be presented with a series of four menu options each associated with a keypad number and/or a voice command for a number. When the call data and user data reflects that the user is a sports fan, the customized menu, customized content, and/or customized advertisements may related to sports topics.

The menu application may also generate content for a customized menu based upon the received inputs from the user, call data, and/or user data. For example, in one embodiment, the menu application may generate an menu options that highlights sports information if the call data and/or user data indicates that the user likes sports content. When the call data and user data reflects that the user is a coffee enthusiast, the customized menu, customized content, and/or customized advertisements may related to coffee topics.

Additionally, when IVR system 136 is constructing customized menus based upon call data include the user's previously recorded interactions, the menu application may utilize a variety of techniques and parameters. For example, the menu application may base the construction of custom menus upon the most recent IVR response, call data, and/or user data.

Figure 3:
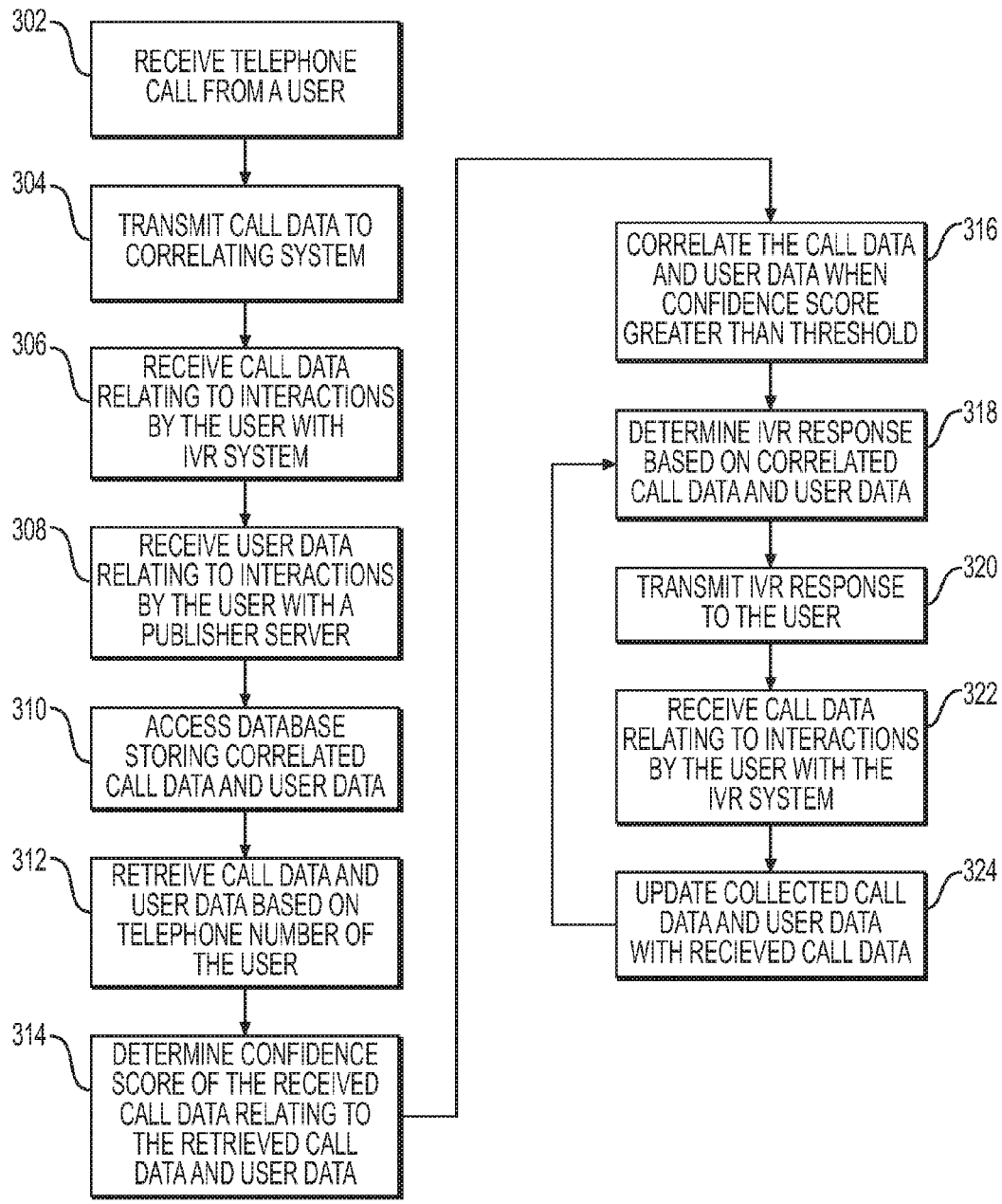
FIG. 3 depicts a flow diagram of an exemplary method for online data-linked telecommunications decisioning and distribution, according to an exemplary embodiment of the present disclosure.

FIG. 3 depicts a flow diagram of a method implemented by the IVR system 136 and/or the correlating system 102 for online data-linked telecommunications decisioning and distribution, according to embodiments of the present disclosure. The method may be performed in part or in full by the IVR system 136 and/or the correlating system 102. Some or all steps may be executed by a processor, and stored as a non-transitory computer-executable instructions in a memory.

At step 302, a business 126, an IVR system 136, and/or an onboarding system 104 may receive a telephone call from a telephone and/or mobile device 106 of a user. For example, a user may utilize telephone and/or mobile device 106 to dial a business telephone number. As described above, the business 126, the IVR system 136, and/or onboarder 104 may use automatic number identification and/or a caller ID to determine the telephone number of telephone and/or mobile device 106. The business 126, IVR system 136, and/or onboarder 104 may also determine the dialed number. The business 126, IVR system 136, and/or onboarder 104 may store call data, such as the user's telephone number, the time of the call, the number dialed, and so on. After the business 126 and/or onboarder system 104 receives the telephone call from the user, the business 126 and/or onboard system 104 may transfer the telephone call to the IVR system 136.

At step 204, the business 126, IVR system 136, and/or onboarder 104 may transmit call data to the correlating system 102. Alternatively, the business 126 and/or onboard 104 may transmit the call data to IVR system 136, which may in turn transmit the call data to the correlating system 102. For example, the IVR system 136 may determine which call data to transmit to the correlating system 102 for determining content and/or advertisements to present to the user. The IVR system 136 may include a telephone number of the user, a time and date of the call, information about the business using the IVR system, and IVR data from the users' interactions with an IVR system. For example, while using an IVR system, the user may enter and/or provide information to the IVR system. This call data may be transmitted to the correlating system 102 for determining content and/or advertisements to present to the user during the user's telephone call with the IVR system.

At step 306, the IVR system 136 and/or the correlating system 102 may receive call data relating to interactions by the user with the IVR system. When the IVR system 136 is performing the functions of correlating system 102, it may receive the call data directly from the user. When the IVR system 136 does not perform the functions of correlating system 102, the IVR system 136 may transmit the call data to correlating system 102, and correlating system 102 may receive the call data relating to interactions by the user with the IVR system via the IVR system 136. As discussed above, the call data may also include the phone number of telephone and/or mobile device 106 of the user and other call data relating to the telephone call.

At step 308, the correlating system 102 may receive user data relating to a user's interactions with one or more publisher servers 110. As discussed above, the user data may include a user identifier relating to the user and other data relation to the user.

At step 310, the correlating system 102 may access a correlating system database 102A that stores correlated call data and user data. Then, at step 312, the correlating system 102 may use the received telephone number of telephone and/or mobile device 106 to retrieve call data and user data correlated to the telephone number from the database 102A. For example, the system may use the phone number of telephone and/or mobile device 106 to retrieve a corresponding user identifier provided by a publisher server 110 and stored with the database 102A, along with corresponding user data stored in association with the user identifier. The correlating system 102 may also retrieve call data stored in the database 102A, as well as a confidence score of the associated user identifier that correlates to the telephone number.

At step 314, the correlating system 102 may determine whether the confidence score is within a threshold value. At step 316, if the confidence score is within a threshold value, the correlating system 102 may correlate the received call data from an IVR system 136 with the retrieved user data and call data stored in the database 102A.

At step 318, the correlating system 102 may determine an IVR response for the IVR system 136 to transmit to the user based on the received call data and the retrieved user data and call data when the confidence score is within the threshold value. Then, at step 320, the correlating system 102 may transmit the determined IVR response to a telephone and/or mobile device 106 of the user via the IVR system 136. The IVR response may include content and/or advertisements to present to the user. The content and/or advertisements being based on the call data and user data associated with the user.

For example, the correlating system 102 may request that the IVR system 136 present dynamic menus, customized content, and/or advertisements to the user via telephone and/or mobile device 106. If the user based on the call data and user data is determined to be a sports fan, the content and/or advertisements presented by the IVR system in the IVR response may relate to sports. If the user based on the call data and user data is determined to be a coffee enthusiast, then the content and/or advertisements may related to coffee. Upon presenting the IVR response, the IVR system 136 may notify the correlating system 102 when the content and/or advertisement has been delivered to the user. The IVR response including the content and/or advertisement may be tailored to encourage the user to complete a transaction and/or engage with the IVR system 136. For example, the IVR response may allow a user to bypass unnecessary menus in the IVR system 136 that would otherwise make completing or reinitiating the transaction more cumbersome. For example, the user may be presented a special phone number for directly reaching a person (e.g., bypassing the IVR) who can directly engage the user. Additionally, the IVR response may allow the user to bypass menus that may not be relevant to the user. In some embodiments, the IVR response may be based on historical call data and user data, along with present call data and user data. For example, the IVR response may be based on a past advertisement already presented to the user, past purchases of the user, known likes or dislikes of a user, demographic information characterizing the user, etc.

At step 320, the determined IVR response may be transmitted to the user via the IVR system 136. After the determined IVR response is transmitted to the user, the IVR system 136 may receive additional call data from the user. The IVR system 136 may transmit the new call data to the correlating system 102. Correlating system 102 at step 322 may receive the call data relating to interactions with the IVR system 136 by the user. The, at step 324, the correlating system 102 may update the newly received call data from an IVR system 136 with the retrieved user data and call data stored in the database 102A. Then, the correlating system 102 may proceed to step 318 to determine a new IVR response based on the updated correlated call data and user data.

Figure 4:
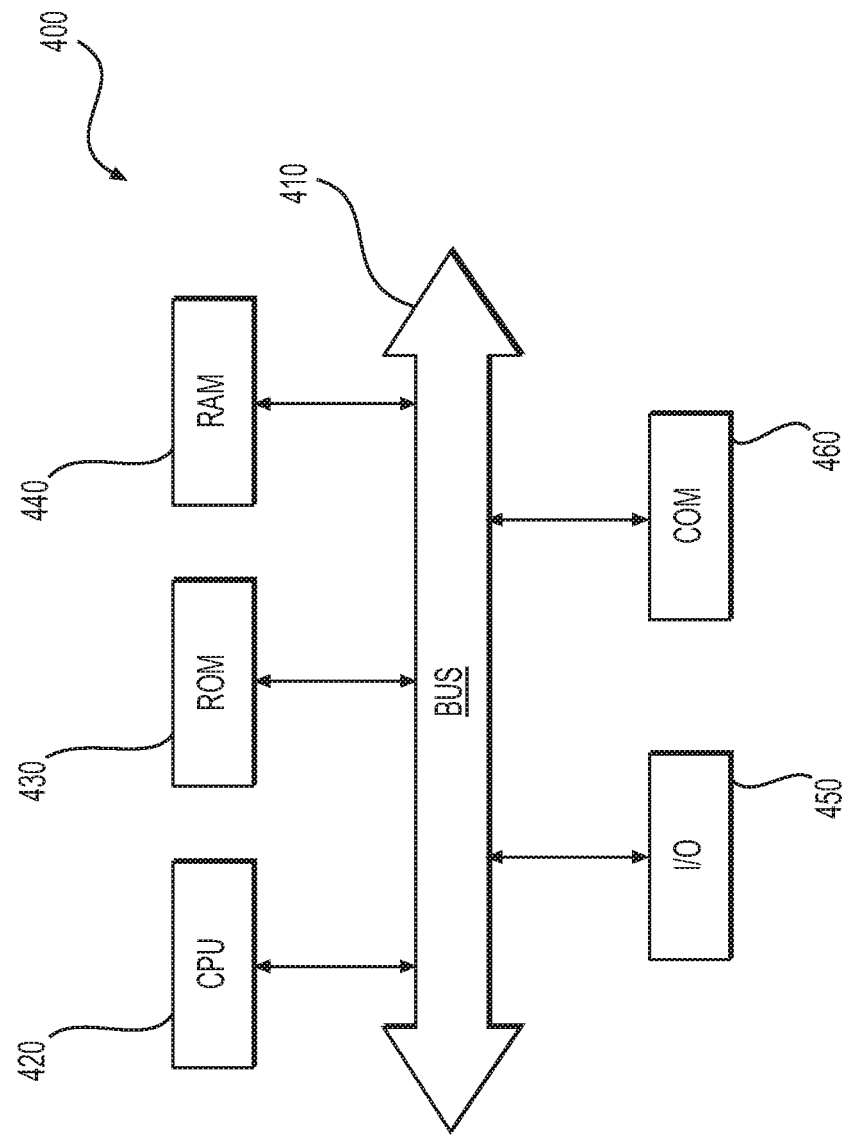
FIG. 4 is a simplified functional block diagram of a computer configured as a device for executing the method of FIG. 3, according to exemplary embodiments of the present disclosure.

FIG. 4 is a simplified functional block diagram of a computer that may be configured as the user devices, IVR systems, servers, CDN, platforms, and/or exchanges for executing the methods, according to exemplary an embodiment of the present disclosure. Specifically, in one embodiment, any of the user devices, IVR systems, servers, CDN, platforms, and/or exchanges may be an assembly of hardware 400 including, for example, a data communication interface 460 for packet data communication. The platform may also include a central processing unit ("CPU") 420, in the form of one or more processors, for executing program instructions. The platform typically includes an internal communication bus 410, program storage, and data storage for various data files to be processed and/or communicated by the platform such as ROM 430 and RAM 440, although the system 400 often receives programming and data via network communications. The system 400 also may include input and output ports 450 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

As will be recognized, the present disclosure is not limited to these particular embodiments. For instance, although described in the context of content and advertisements presented during an interactive voice response session by a user and/or the context of content and advertisements displayed on web pages of websites, the present disclosure may also be used in other types of interactive systems that support the display of selectable advertisements, such as interactive television systems.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

The invention claimed is:

1. A computer-implemented method for online data-linked telecommunications decisioning and distribution, the method comprising:

receiving, over an electronic network, call data relating to a telephone call from a telephone device of a user to an interactive voice response ("IVR") system, the call data including a telephone number of the telephone device of the user;

accessing, by at least one processor, a database storing correlated call data and user data;

retrieving, by the at least one processor, correlated call data and user data based on the telephone number of the call data;

determining, by the at least one processor, a confidence score defining a confidence that the received call data relates to the retrieved correlated call data and user data;

correlating, by the at least one processor, the received call data with retrieved call data and user data when the confidence score is greater than a threshold value;

determining, by the at least one processor, an IVR response to present to the user via the IVR system, based on the correlated call data and user data; and transmitting, over the electronic network, the determined IVR response to the IVR system for presentation to the telephone device of the user.

2. The method according to claim 1, further comprising:
receiving, over the electronic network, user data relating to interactions by a computing device of the user with a publisher server, the user data including a user identifier of the user.

3. The method according to claim 2, further comprising:
accessing, by at least one processor, the database storing correlated call data and user data;
retrieving, by the at least one processor, correlated call data and user data based on the user identifier of the user data; and
correlating, by the at least one processor, the received user data with retrieved call data and user data.

4. The method according to claim 1, wherein the call data includes at least one of call metadata, a telephone number dialed, a call time, a call date, a length of the phone call, responses by the user to the IVR system, and data related to the user calling.

5. The method according to claim 1, further comprising:
receiving, over the electronic network, updated call data relating to the telephone call from the telephone device of the user to the IVR system; and
correlating, by the at least one processor, the updated call data with retrieved call data and user data.

6. The method according to claim 5, further comprising:
determining, by the at least one processor, an updated IVR response to present to the user via the IVR system, based on the correlated updated call data and user data; and
transmitting, over the electronic network, the determined updated IVR response to the IVR system for presentation to the telephone device of the user.

7. The method according to claim 1, wherein the IVR response includes at least one of content and an advertisement to be presented to the user, the at least one of content and advertisement based on the correlated call data and user data.

8. A system for online data-linked telecommunications decisioning and distribution, the system including:
a data storage device that stores instructions system for online data-linked telecommunications decisioning and distribution; and
a processor configured to execute the instructions to perform a method including:
receiving, over an electronic network, call data relating to a telephone call from a telephone device of a user to an interactive voice response ("IVR") system, the call data including a telephone number of the telephone device of the user;
accessing a database storing correlated call data and user data;
retrieving correlated call data and user data based on the telephone number of the call data;
determining a confidence score defining a confidence that the received call data relates to the retrieved correlated call data and user data;
correlating the received call data with retrieved call data and user data when the confidence score is greater than a threshold value;
determining an IVR response to present to the user via the IVR system, based on the correlated call data and user data; and
transmitting, over the electronic network, the determined IVR response to the IVR system for presentation to the telephone device of the user.

9. The system according to claim 8, wherein the processor is further configured to execute the instructions to perform the method including:
receiving, over the electronic network, user data relating to interactions by a computing device of the user with a publisher server, the user data including a user identifier of the user.

10. The system according to claim 9, wherein the processor is further configured to execute the instructions to perform the method including:
accessing the database storing correlated call data and user data;
retrieving correlated call data and user data based on the user identifier of the user data; and
correlating the received user data with retrieved call data and user data.

11. The system according to claim 8, wherein the call data includes at least one of call metadata, a telephone number dialed, a call time, a call date, a length of the phone call, responses by the user to the IVR system, and data related to the user calling.

12. The system according to claim 8, wherein the processor is further configured to execute the instructions to perform the method including:
receiving, over the electronic network, updated call data relating to the telephone call from the telephone device of the user to the IVR system; and
correlating, by the at least one processor, the updated call data with retrieved call data and user data.

13. The system according to claim 12, wherein the processor is further configured to execute the instructions to perform the method including:
determining, by the at least one processor, an updated IVR response to present to the user via the IVR system, based on the correlated updated call data and user data; and
transmitting, over the electronic network, the determined updated IVR response to the IVR system for presentation to the telephone device of the user.

14. The system according to claim 8, wherein the IVR response includes at least one of content and an advertisement to be presented to the user, the at least one of content and advertisement based on the correlated call data and user data.

15. A non-transitory computer-readable medium storing instructions that, when executed by a computer, cause the computer to perform a method for online data-linked telecommunications decisioning and distribution, the method including:
receiving, over an electronic network, call data relating to a telephone call from a telephone device of a user to an interactive voice response ("IVR") system, the call data including a telephone number of the telephone device of the user;
accessing, by at least one processor, a database storing correlated call data and user data;
retrieving, by the at least one processor, correlated call data and user data based on the telephone number of the call data;
determining, by the at least one processor, a confidence score defining a confidence that the received call data relates to the retrieved correlated call data and user data;
correlating, by the at least one processor, the received call data with retrieved call data and user data when the confidence score is greater than a threshold value;
determining, by the at least one processor, an IVR response to present to the user via the IVR system, based on the correlated call data and user data; and
transmitting, over the electronic network, the determined IVR response to the IVR system for presentation to the telephone device of the user.

16. The computer-readable medium according to claim 15, further comprising:
receiving, over the electronic network, user data relating to interactions by a computing device of the user with a publisher server, the user data including a user identifier of the user.

17. The computer-readable medium according to claim 16, further comprising:
accessing, by at least one processor, the database storing correlated call data and user data;
retrieving, by the at least one processor, correlated call data and user data based on the user identifier of the user data; and
correlating, by the at least one processor, the received user data with retrieved call data and user data.

18. The computer-readable medium according to claim 15, wherein the call data includes at least one of call metadata, a telephone number dialed, a call time, a call date, a length of the phone call, responses by the user to the IVR system, and data related to the user calling.

19. The computer-readable medium according to claim 15, further comprising:
receiving, over the electronic network, updated call data relating to the telephone call from the telephone device of the user to the IVR system; and
correlating, by the at least one processor, the updated call data with retrieved call data and user data.

20. The computer-readable medium according to claim 19, further comprising:
determining, by the at least one processor, an updated IVR response to present to the user via the IVR system, based on the correlated updated call data and user data; and
transmitting, over the electronic network, the determined updated IVR response to the IVR system for presentation to the telephone device of the user.

\* \* \* \* \*